2 Sheets—Sheet 1.

N. H. RICHARDSON.
MEASURING MECHANISM FOR RATTAN MACHINES.

No. 189,957. Patented April 24, 1877.

Fig. I.

Witnesses:
C. Clarence Poole
Rich'd K. Evans

Inventor
N. H. Richardson
by A. H. Evans & Co
his Atty's

2 Sheets—Sheet 2.

N. H. RICHARDSON.
MEASURING MECHANISM FOR RATTAN MACHINES.

No. 189,957. Patented April 24, 1877.

Witnesses:
Clarence Poole
Rich'd K. Evans

Inventor:
N. H. Richardson,
by A. H. Evans & Co
his Atty's

UNITED STATES PATENT OFFICE.

NATHAN H. RICHARDSON, OF FITCHBURG, MASSACHUSETTS.

IMPROVEMENT IN MEASURING MECHANISMS FOR RATTAN-MACHINES.

Specification forming part of Letters Patent No. 189,957, dated April 24, 1877; application filed March 3, 1877.

*To all whom it may concern:*

Be it known that I, NATHAN H. RICHARDSON, of Fitchburg, Massachusetts, have invented certain Improvements in Rattan-Machines, of which the following is a clear, full, and exact description, reference being had to the accompanying drawings, making a part of this specification, in which—

Figure 1:
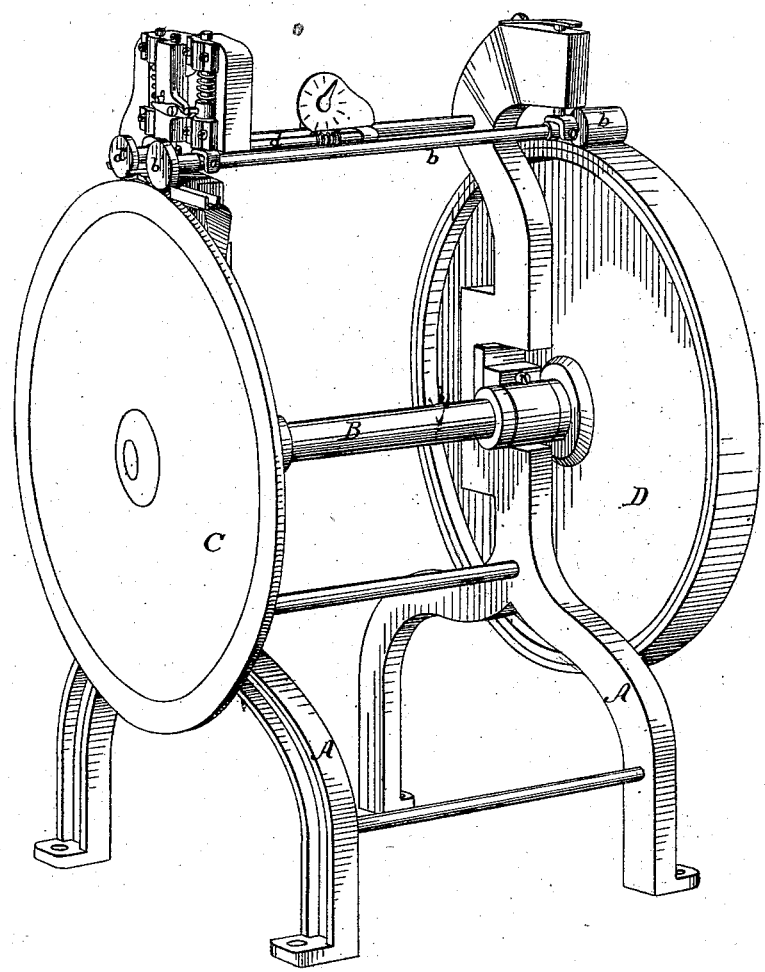
Figure 2:
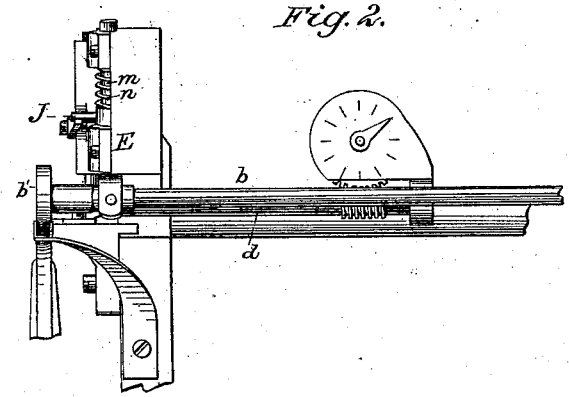
Figure 3:
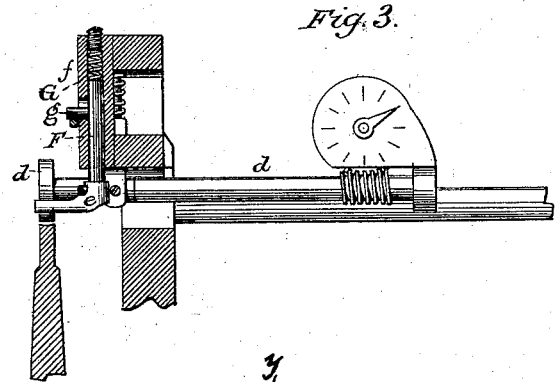
Figure 4:
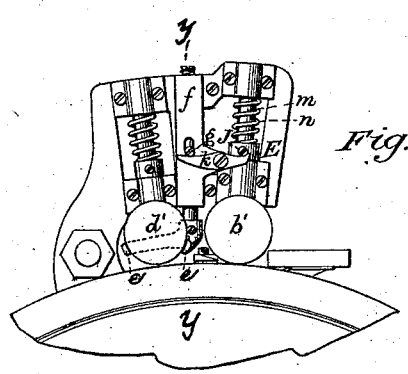

Figure 1 is a perspective view of a rattan-machine with my improvements attached. Fig. 2 is a partial side elevation, showing the face of the registering-dial. Fig. 3 is a longitudinal vertical section through $y\ y$ of Fig. 4. Fig. 4 is a front elevation, showing the mechanism for automatically stopping the registering device.

This invention relates to rattan-machines; and it consists of a registering mechanism applied to a rattan-machine, and provided with means for automatically stopping the motion imparted to it by the passage of the stand to be measured.

To enable others skilled in the art to make and use my improvements, I will proceed to describe the exact manner in which I have carried them out.

In the drawings, A represents the framework of the machine, with the main shaft B, which carries the large wheel or disk C on one and the friction-wheel D at the other. The friction-wheel D drives the shaft $b$ and feed-wheel $b'$. This shaft $b$ has its bearing in the lower bifurcated end of the vertical shaft $m$, which slides in a head or frame, E, and is surrounded by a spiral spring, $n$, against the resistance of which the feed-wheel is raised by the strip of cane as it passes between it and the wheel C.

The measuring-roll $d'$ on the shaft $d$ has a bearing corresponding to that of the feed-wheel $b'$, and is in like manner provided with a spring, which keeps it in such contact with the stand passing under it as to cause it to rotate, and thus operate the registering mechanism, and which, at the same time, permits it to yield to accommodate the varying thickness of the strands to be measured; but this measuring-roll should not be allowed to descend so far toward the large wheel or disk C as to be brought into actual contact therewith.

The object of my present invention is to counteract the momentum of the measuring-roll and mechanism connected therewith, acquired during the rapid passage of the strand beneath it, and to arrest its motion at the instant of the exit of the strand.

This is accomplished by means of brake $e\ e$, located in such position that when the strand of rattan passes under the measuring-roll it lifts the same out of contact with the brake, and when the strand leaves the measuring-roll it permits the same to be brought against the brake again.

In order, however, to insure the prompt action of the brake, I have provided the following additional mechanism: The brake $e\ e$ is attached to the lower end of a vertical rod, F, sliding in the casing $f$, (see Fig. 4,) and having at its upper end a spiral spring, G, by which the brake is forced down to the lowest position required for clearing it from the roll $d'$ while the strand of cane is being measured. On the side of the rod F is a projecting pin, $g$, against which bears one arm of the lever $k$, pivoted to a projection in the casing $f$, the other arm of the lever being in contact with a pin projecting from the vertical shaft $m$ of the wheel $b'$, which, in this instance, is the feed-roll, but which, for the purposes of my invention, may be an auxiliary wheel, independent of the feed-roll, but arranged and supported in like manner.

From the foregoing description it is evident that as the cam passes under the wheel $b'$ the pin J allows the spring G to move the brake away from the measuring-wheel $d'$; but when the strand leaves the wheel $b'$ the latter is forced down by the spring $n$, and with it descends the vertical shaft $m$ and pin J, which, in turn, by means of the lever $k$, forces up the pin $g$ and vertical shaft F, whereby the brake is again moved toward the wheel $d'$ and into such close proximity therewith that the two are brought into frictional contact and the motion of the measuring-wheel arrested at the instant of the exit of the strand.

What I claim as new, and desire to secure by Letters Patent, is—

1. In a rattan-machine, provided with a registering mechanism, the combination of a measuring-roll and a brake, which are automatically separated by the strand to be measured, and brought together again upon the exit of the strand, substantially as described.

2. In a rattan-machine, the combination of a registering mechanism and a brake, provided with a reacting spring, and operated by a wheel auxiliary to the measuring-roll, substantially as described.

NATHAN H. RICHARDSON.

Witnesses:
 GEO. W. CANN,
 T. K. WARE.